United States Patent [19]
Carr

[11] Patent Number: 5,695,792
[45] Date of Patent: Dec. 9, 1997

[54] BLOW MOLDING MACHINE FOR MAKING HOLLOW PLASTIC ARTICLES

[75] Inventor: Gary Carr, Okemos, Mich.

[73] Assignee: BEKUM Maschinenfabriken GmbH, Berlin, Germany

[21] Appl. No.: 654,557

[22] Filed: May 29, 1996

[30] Foreign Application Priority Data

May 29, 1995 [DE] Germany .......... 295 08 864 U

[51] Int. Cl.$^6$ .................... B29C 49/32; B29C 49/56
[52] U.S. Cl. .................... 425/532; 425/451; 425/453; 425/541
[58] Field of Search .................... 425/522, 541, 425/532, 451, 453, DIG. 20

[56] References Cited

U.S. PATENT DOCUMENTS

| | | | |
|---|---|---|---|
| 4,459,095 | 7/1984 | Rohr et al. | 425/541 |
| 4,468,368 | 8/1984 | Hafele | 425/541 |
| 4,552,526 | 11/1985 | Hafele | 425/522 |
| 4,815,955 | 3/1989 | Krall | 425/522 |
| 5,486,103 | 1/1996 | Meiring et al. | 425/541 |

FOREIGN PATENT DOCUMENTS

| | | | |
|---|---|---|---|
| 2318315 | 11/1974 | Germany | 425/532 |
| WO92/13703 | 8/1992 | WIPO | 425/522 |

*Primary Examiner*—Robert Davis
*Attorney, Agent, or Firm*—Juettner Pyle Lloyd & Piontek

[57] ABSTRACT

A blow-molding machine for producing hollow plastic articles comprises a blow mold having a plurality of cavities corresponding to the shape and dimension of the finished hollow articles. The blow mold has at least two closely adjacent and separate blow molds and an opening and closing system operatively associated with each blow mold. The machine is provided with a tube station and a blow station. The tube station has a plurality of tube-shaped parison-forming heads located parallel to and next to each other for filling each cavity with a parison. The number of cavities corresponds to the number of parisons. The blow station is offset relative to the tube station and thereat the parisons in closed blow molds are inflated to the finished hollow articles. A joint transportation system for moving all of said blow molds between the tube station and the blow station is provided.

6 Claims, 2 Drawing Sheets

BLOW MOLDING MACHINE FOR MAKING HOLLOW PLASTIC ARTICLES

BACKGROUND OF THE INVENTION

Hollow plastic articles, such as containers for liquids or bulk material, are most of the time produced in so-called high performance blow molding machines, unless large hollow plastic articles are produced, for example large containers in the form of metal containers or vats. High performance blow molding machines are machines that have a high output per time unit and the blow molds have most of the time more than one cavity or mold trough arranged side by side, so that after the blow mold has been filled with inflatable parisons a plurality of hollow plastic articles can simultaneously be blown out in a station that is equipped with a plurality of blow means. The main parts of the blow means are often blow pins, especially when hollow articles are produced and provided with a filling and dispensing opening (bottles, or the like). Simultaneously with their injection into a parison, which is open at one end, blow pins introduce the blow medium and form the filling and dispensing opening with their calibration member by press molding at the same time. However, it is also possible to use blow needles pierced into the parison for introducing the blow medium into the parison for introducing the blow medium into the parison, especially when hollow articles other than bottles, or the like, are made, for instance so-called technical parts. Blow pins are only referred to in the following text for reasons of a simplified description.

SUMMARY OF THE INVENTION

A system which is often referred to as "alternate calibration" has here proved efficient. In such a system use is made of two blow stations that are equidistant from tube stations located between said blow and possibly calibration stations, wherein a plurality of adjacent tube forming heads or a group of tube forming heads produce the necessary number of tubes side by side, and the tubes are introduced as parisons into a blow mold provided underneath the tube forming head. While a blow mold below the group of tube forming heads receives a number of parisons corresponding to the number of cavities, a first blow station has located thereunder a second closed blow mold in which a blow and calibration pin is injected into a respective cavity for molding the neck portion of a hollow plastic article, when a container with an opening, such as a bottle, is concerned, and for inflating the remaining parison to form the hollow plastic article. During this phase the space below the second blow station is not occupied. When in the tube station the previously opened blow mold has closed around the parisons extruded in corresponding lengths from the nozzles of the tube forming heads and when in said first blow and calibration station the hollow articles have been blown out in their final shape and ejected after the blow mold has been opened, with the hollow plastic articles being most of the time subjected to further treatment, the closed blow mold together with the parisons as received is moved out of the tube station below the other blow station, and the open blow mold out of the previously operative first blow station below the tube station, whereupon the filling operation in the tube station and the molding operation in the blow station are repeated. For instance, when four tubes of inflatable moldable material of plastics are ejected from the group of tube forming heads and introduced in parallel with each other and side by side into the four cavities of a first blow mold, and when at the same time four hollow plastic articles are blown out in a blow station in the second mold and four other hollow plastic articles are subsequently blown out in the first mold below the second blow station while four new parisons are simultaneously received in the tube station by the second blow mold, eight hollow plastic articles will be made in one cycle when a blow mold has four cavities. Of course this is only an example, two or more cavities are standard in a blow mold, and five and six cavities are sometimes seen as well.

In practice, however, the production of a hollow plastic article, such as a bottle or a technical blown part, as demanded by customers, requires more than the mere inflation of a parison in the closed blow mold in the blow station. As is generally known, waste parts which must be removed, most of the time mechanically, are created by pinched-off areas of the parison in the neck portion and at the bottom of a container or other articles when the mold is closed. It also happens quite often that leakage tests with correspondence test devices are demanded for the hollow articles that have been produced, and it can also be observed quite often that labels are to be applied already to the hollow articles in the mold during the production thereof, a method which is known under the name IML (inner mold labeling), to name just a few of the possible additional treatment stages. However, in order to perform such postforming processes, such as waste removal and leakage test, the hollow plastic articles leaving the blow mold must have solidified entirely, which requires an aftercooling station following the blow stations. In the above cases, which are rather the rule than the exception, the alternative calibration system which operates with a respective blow station at the right and left sides of a tube station has the drawback that each blow station must have assigned thereto a corresponding device, e.g., an aftercooling station, waste separating device and/or IML device, which complicates the monitoring of a machine, which is often a cost factor at any rate, and whereby the whole machine will be stopped upon a standstill of even only one auxiliary device at one side.

For this reason, machines have been put on the market that only operate towards one side, i.e., have only one blow station for molding the parisons into hollow plastic articles, namely laterally offset relative to the tube station, and in the case of which only one blow mold is moved back and forth between the tube station and the blow station. In such a case only one auxiliary device is needed, and an IML device, for example, may be placed next to the tube station, and an aftercooling station and waste separating device next to the blow station. In this system, however, if the output per time unit is not to decrease and the advantages of alternate calibration are not to be given up, the cavities distributed over blow molds in the case of alternate calibration must be accommodated in a blow mold, i.e., the blow molds must be constructed with a corresponding length. A blow mold including eight cavities for bottles of a diameter of about 80 mm may then have a length of more than 1000 mm. Since a large, i.e., long, blow mold must be moved from the area of the tube station into the blow station in such a case and since the distance between tube station and blow station must consequently be slightly larger than the length of a blow mold, i.e., a great stroke has to be handled by the corresponding displacement device for displacing the blow mold from the tube station into the blow station and back, these machines are called "long-stroke machines."

The large blow molds required for long-stroke machines, which have a plurality of cavities, can however only be produced with difficulty, i.e., at high costs, and are also difficult to handle. Apart from the increased weight, the incorporation of, for instance, eight cavities into the mold parts of which the mold is made requires much more accuracy than the incorporation of four respective cavities into a blow mold because in the most disadvantageous case even slight tolerance deviations may add up to discrepancies that will be noticed in practice. Furthermore, with an increasing size of a blow mold provided with a plurality of mold troughs or cavities, the tight closing of the mold for the inflation process becomes an increasingly greater problem in the parting plane of the blow mold parts. The more cavities are accommodated in a long mold, the more accurately must the mold parts be produced for achieving a firm and tight closure of the mold because, when the mold is not firmly and tightly closed over its entire length, marks will be produced along the mold separating edges in the parisons pressed under pressure against the cavity wall during the blowing operation, i.e., scrap will be produced. Moreover, with long blow molds it is difficult to achieve a uniform distribution of forces over the blow mold during the closing process. This makes the pinching off of excessive material unpredictable, for instance in the case of bottles having a handle.

Another drawback is that a buyer of the machine can no longer use the molds and mold clamping plates existing in other machines already installed in his works, but will always have to resort to new clamping plates and new large and expensive molds.

It has therefore been the object of the present invention to create a long-stroke machine which overcomes the above-mentioned drawbacks.

DESCRIPTION OF THE PREFERRED EMBODIMENTS

Figure 1:
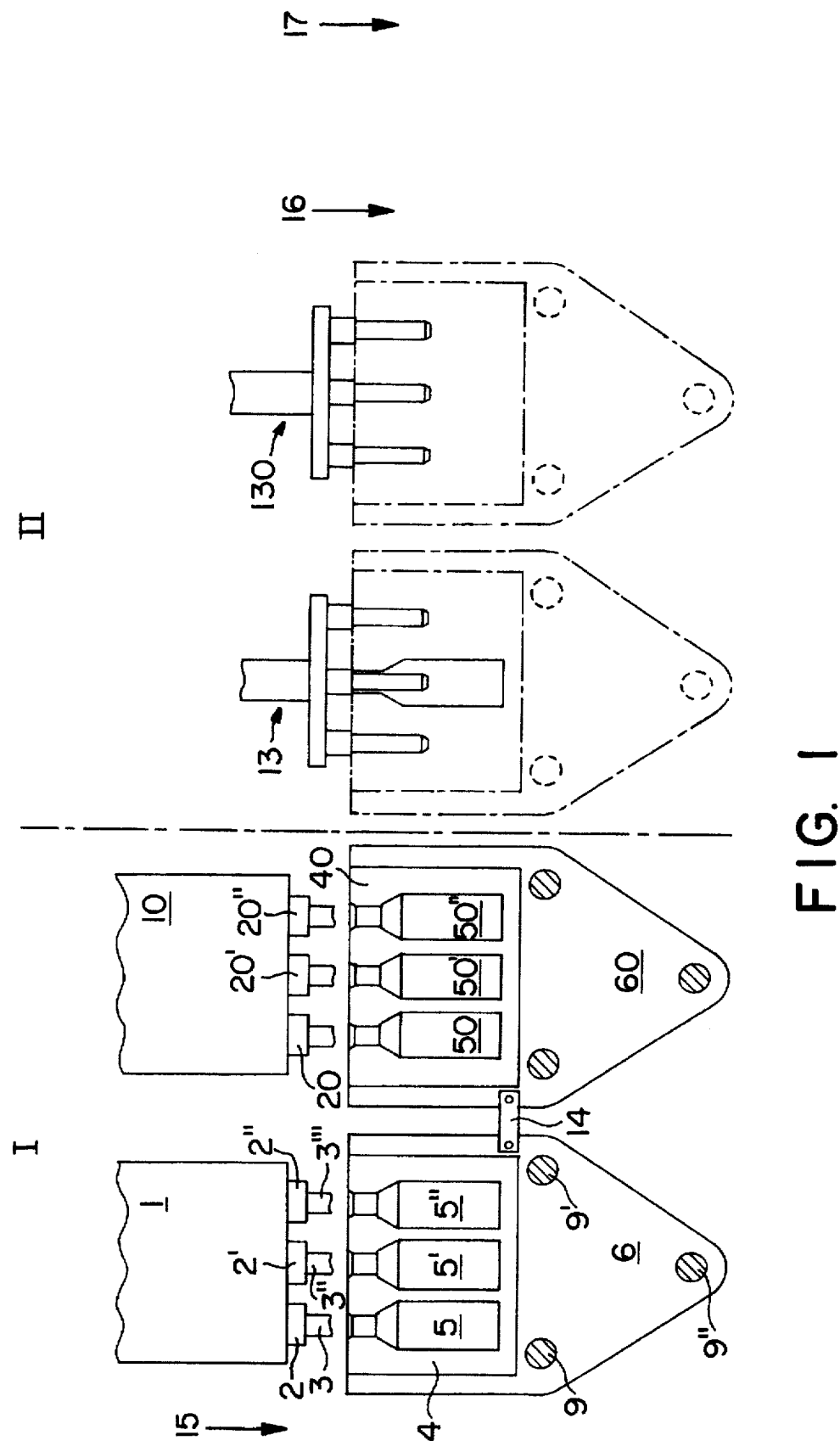
FIG. 1 schematically shows the constructional principle of a machine according to the invention in a lateral view and on an enlarged scale.
Figure 2:
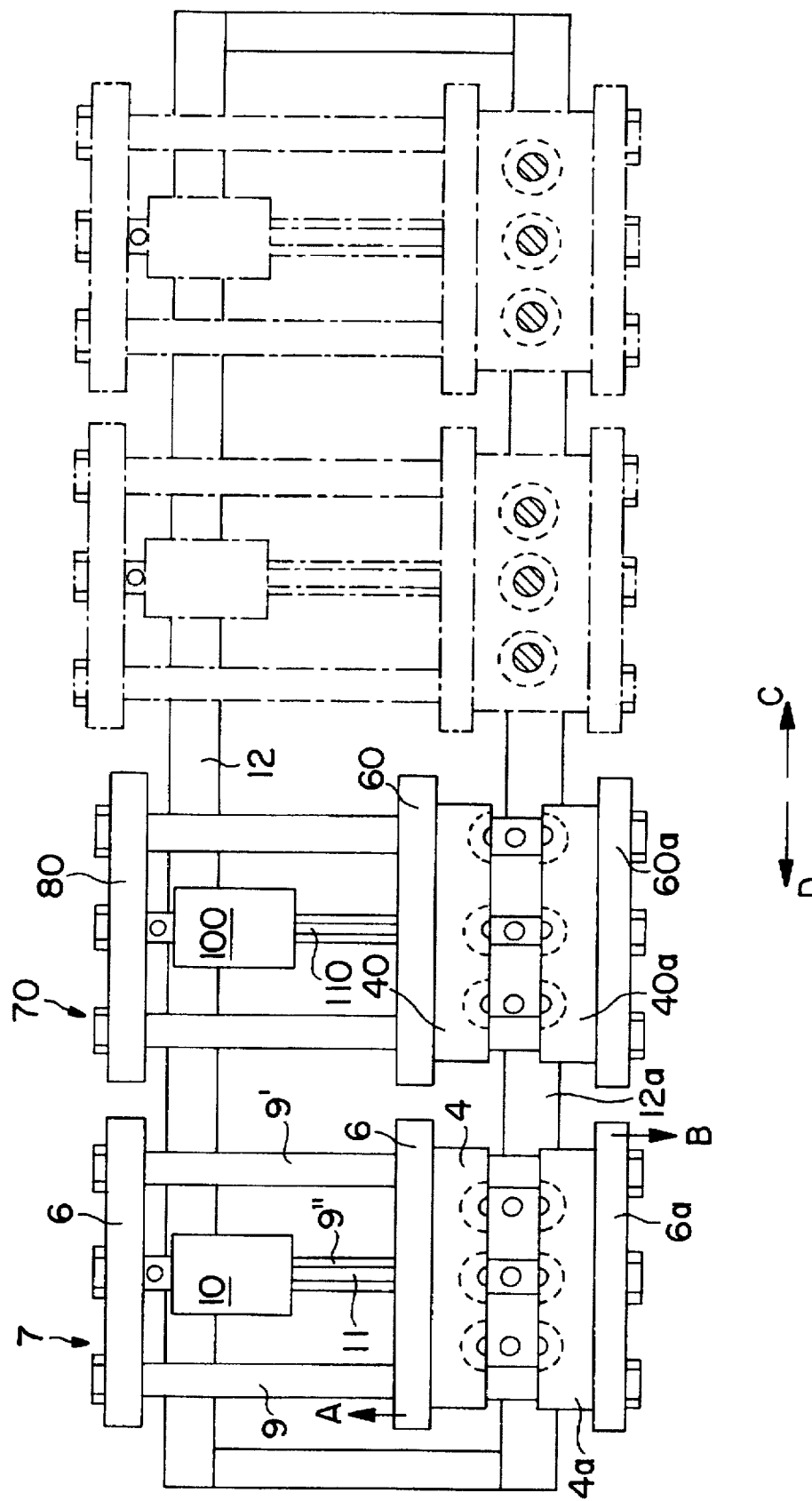
FIG. 2 is a top view on the object shown in FIG. 1.

In FIG. 1, reference numeral 1 designates a group of tube forming heads connected to the discharge nozzle of an extruder (not shown), wherein the full plastic extrudate pressed out of the extruder is changed. The illustrated example shows a group of three tube forming heads whose nozzles 2, 2', 2" discharge tubes 3, 3', 3" form the parisons. It is only for reasons of a simplified illustration that the figure shows one group of tube forming heads which produce three tubes, and thus a blow mold half 4 with three cavities 5, 5', 5", but blow molds with four or five cavities or, depending on the size of the hollow plastic article to be made, even more cavities are possible. Also for reasons of a simplified and thus clearer illustration in FIG. 1, blow mold cavities 5, 50 have been omitted in the blow station.

The blow mold halves 4, 4a are replaceably secured in a per se known manner to mold supporting or clamping plates 6, 6a which form part of a known closing system, generally designated by 7. In the illustrated embodiment, the closing system includes a main head 8 which is connected to support plate 6a by traverse members, for example three traverse members 9, 9', 9", located underneath blow mold 4, 4a. Support plate 4 is displaceably supported with mold half 4 on said traverse members. Main head 8 and clamping plate 6 have arranged therebetween a closing motor which is secured with one part, for instance with a cylinder 10, to the main head and with its other part, for instance piston rod 11, to the clamping plate 6. With the aid of the closing motor, it is possible to move the clamping plate 6 and thus the mold half via the piston rod 11 in the direction of arrow A for opening the mold and to move clamping plate 6a in the direction of the arrow B via the main head 8. On the other hand, the clamping plate 6 is moved with the aid of the closing motor 10, 11 in the direction of arrow B for closing the mold, and clamping plate 6a is moved in the direction of arrow A. The simplified view of the closing system shows a reliable system that has often been used, but there exist also other types of closing systems. It is of no importance to the invention which one of the systems is employed.

According to the invention, the unit consisting of the blow mold 4, 4a and the closing system has arranged directly next thereto at least one unit which is expediently of the same structure and consists of the blow mold 40, 40a and the closing system 70 with support plates 60, 60a and closing motor 100, 110. Units 7, 70 are combined to form one transportation system and can be jointly displaced in the directions of arrows C, D in any suitable manner, for instance on rails 12, between tube station I and blow station II.

The production of the blow mold becomes considerably less troublesome and expensive owing to the division of one large and long blow mold with many, e.g., eight or ten, cavities into two blow molds having, for instance, four or five cavities each. Hence, the closing system 7, 70 form a simultaneously operating unit which can be moved between tube station I and blow and calibration station II so that, for example, 6, 8 or 10 hollow plastic articles can be produced in each cycle, and a user is in a position to use molds and clamping plates, possibly whole closing systems, available to him from machines based on alternate calibration.

In the illustrated embodiment, each blow mold 4, 4a–40, 40a has assigned thereto a group of tube forming heads 1, 10 with nozzles 2, 20, whereby units are formed that can also be produced and serviced more easily and can possibly be repaired.

The same applies to the illustrated embodiment of the blowing and possibly calibrating device 13 and 130, respectively.

The closing systems 7, 70 and, in case a respective tube forming head group 1, 10 and/or a blow device 13, 130 are provided for each blow mold 4, these members, too, are controlled in synchronism, but an advance or lag as to the other unit is not harmful within a small time interval.

Arrows 15 to 17 schematically illustrate where, for example, a labeling device 15, an aftercooling station 16 and a waste separating device 17 could be located.

The division of a long blow mold with many mold cavities into two or more blow molds with a correspondingly smaller number of cavities also permits the simultaneous running of a plurality of hollow article programs, e.g., two or three at a time. Hence, it would e.g. be possible to produce three bottles with handles in one blow mold, four bottles that are smaller in comparison therewith in a second blow mold, and five ampules in a third blow mold, all at the same time.

What is claimed is:

1. A blow-molding machine for producing hollow plastic articles, the machine comprising:
   a blow mold having a plurality of cavities corresponding to the shape and dimension of said finished hollow articles, said blow mold further comprising at least two closely adjacent and separate blow molds and an opening and closing system for each blow mold:
   a tube station having a plurality of tube-shaped parison-forming heads located parallel to and next to each other for filling each of said cavities with a parison such that said plurality of cavities corresponds to the number of parisons;

a blow station offset relative to said tube station at which the parisons in said closed blow molds are inflated to said finished hollow articles; and a joint transportation system for moving all of said blow molds between the tube station and the blow station.

2. The blow molding machine according to claim 1 wherein said tube station further comprises a number of tubes forming heads corresponding to the number of said plurality of cavities.

3. The blow molding machine according to claim 1 wherein said blow station further comprises a blow device corresponding to each blow mold.

4. The blow molding machine according to claim 3 wherein said blow station further comprises a calibration station corresponding to each blow mold.

5. A blow-molding machine for producing hollow plastic articles, the machine comprising:

a blow mold having a plurality of cavities corresponding to the shape and dimension of said finished hollow articles, said blow mold further comprising at least two closely adjacent and separate blow molds and an opening and closing system for each blow mold;

a tube station having a plurality of tube-shaped parison-forming heads combined into a battery for filling each of said cavities with a parison such that said plurality of cavities corresponds to the number of parisons;

a blow station offset relative to said tube station at which the parisons in said closed blow molds are inflated to said finished hollow articles; and a joint transportation system for moving all of said blow molds between the tube station and the blow station.

6. The blow molding machine according to claim 5 wherein said tube station further comprises a group of forming heads corresponding to the number of said plurality of cavities.

* * * * *